United States Patent
Kishi et al.

(10) Patent No.: US 6,930,465 B2
(45) Date of Patent: Aug. 16, 2005

(54) RESIDUAL CAPACITY CORRECTION METHOD FOR BATTERY

(75) Inventors: Hideki Kishi, Hyogo (JP); Hidenori Tsuda, Hyogo (JP); Kenji Kawaguchi, Hyogo (JP); Hideyuki Nagaya, Hyogo (JP); Tooru Amazutsumi, Hyogo (JP)

(73) Assignee: Sanyo Electric Co., Ltd., Noriguchi (JP)

( * ) Notice: Subject to any disclaimer, the term of this patent is extended or adjusted under 35 U.S.C. 154(b) by 10 days.

(21) Appl. No.: 10/066,750

(22) Filed: Feb. 6, 2002

(65) Prior Publication Data

US 2002/0105303 A1 Aug. 8, 2002

(30) Foreign Application Priority Data

Feb. 7, 2001 (JP) ...................................... 2001-031600

(51) Int. Cl.[7] ................................................. H02J 7/00
(52) U.S. Cl. ...................................................... 320/132
(58) Field of Search ................................ 320/132, 130, 320/134, 136, 139, 160, 127; 324/426, 427, 428

(56) References Cited

U.S. PATENT DOCUMENTS

| | | | | |
|---|---|---|---|---|
| 5,283,512 A | * | 2/1994 | Stadnick et al. | 320/122 |
| 5,614,804 A | * | 3/1997 | Kayano et al. | 320/134 |
| 5,796,239 A | * | 8/1998 | van Phuoc et al. | 320/107 |
| 6,114,836 A | * | 9/2000 | Hagiwara et al. | 320/132 |
| 6,194,874 B1 | * | 2/2001 | Kalogeropoulos et al. | 320/160 |

* cited by examiner

Primary Examiner—Pia Tibbits
(74) Attorney, Agent, or Firm—Wenderoth, Lind & Ponack, L.L.P.

(57) ABSTRACT

In a residual capacity correction method for a battery, a count of one cycle is made each time an accumulated quantity of a charge capacity of a battery reaches a learning capacity of the battery at that time, and the learning capacity is decreased by a specified cycle degradation capacity per charge of the one cycle, alternatively a decreasing rate of the learning capacity is specified as a keeping degradation capacity while a keeping temperature and a residual capacity of the battery are used as parameters, and as a keeping time passes, the learning capacity is decreased by the keeping degradation capacity specified from the keeping temperature and the residual capacity of the battery.

12 Claims, 2 Drawing Sheets

US 6,930,465 B2

RESIDUAL CAPACITY CORRECTION METHOD FOR BATTERY

This application is based on Application No. 031600 filed in Japan on Feb. 7, 2001, the content of which is incorporated hereinto by reference.

BACKGROUND OF THE INVENTION

The present invention relates to a method of correcting a learning capacity of a battery, which becomes a reference in calculation of a residual capacity of a battery, in a charging and discharging cycle and or an inactive state. In the present specification, the learning capacity means a corrected full charge capacity of a battery.

A battery is slightly degraded in keeping, and a full charge capacity is gradually decreased. In the case where a residual capacity of a battery is expressed as a relative value to the full charge capacity by, for example, %, it is important to accurately correct the full charge capacity (FCC). As a correction method of the full charge capacity, various methods have been proposed. For example, charge capacity until a completely discharged battery is fully charged is integrated to calculate the full charge capacity, alternatively discharge capacity until the fully charged battery is completely discharged is integrated to calculate the full charge capacity, the calculated full charge capacity is made a correct value, and the former full charge capacity is corrected. This method can accurately correct the full charge capacity of the battery.

However, in the method of calculating the full charge capacity in the state in which the completely discharged battery is fully charged or the fully charged battery is completely discharged, the timing when the full charge capacity is calculated and can be corrected becomes an extremely limited state. Thus, the frequency of correcting the full charge capacity is low and an error becomes large between corrections. For example, if a battery is maintained in a state where charging and discharging are not performed in a long period of, for example, several months or one year, the fully charged or completely discharged state does not occur, and the full charge capacity can not be accurately corrected. Thus, when the battery is used after storing for a long period, an error of an indication of the residual capacity becomes large.

Further, even in the case where the battery is used in a state where charging and discharging are performed, in the method in which the charge capacity or the discharge capacity between the full charge and the complete discharge is calculated and a correction is made, if the battery is used in the state where it is not completely discharged, it is impossible to calculate and correct the full charge capacity. In the case where the battery is used as a power source of an electrical equipment such as a laptop microcomputer, the battery is held in the fully charged state in almost all cases. This is because the electrical equipment is always put in a usable state so that it can be conveniently used. When the battery is completely discharged, the electrical equipment using this as the power source can not be used. Before this electrical equipment is used, it is necessary to charge the battery over a long period of time. In this use state, the electrical equipment can not be conveniently used. Thus, although the method of calculating and correcting the full charge capacity between the full charge and the complete discharge has the feature that the full charge capacity can be accurately corrected, it has a defect that the full charge capacity of the battery can not be always accurately corrected.

The present invention has been developed in order to solve this defect. A primary object of the present invention is to provide a residual capacity correction method for a battery in which a learning capacity as a full charge capacity of the battery can be corrected simply, easily and more accurately.

SUMMARY OF THE INVENTION

In a residual capacity correction method for a battery according to the present invention, a count of one cycle is made each time an accumulated quantity of a charge capacity of a battery reaches a learning capacity of the battery at that time, and a learning capacity is decreased by a specified cycle degradation capacity per charge of the one cycle.

In a residual capacity correction method for a battery according to the present invention, a decreasing rate of a learning capacity is specified as a keeping degradation capacity while a keeping temperature and a residual capacity of the battery are used as parameters, and as a keeping time passes, the learning capacity can be decreased by the keeping degradation capacity specified from the keeping temperature and the residual capacity of the battery.

In a residual capacity correction method for a battery according to the present invention, a count of one cycle is made each time an accumulated quantity of a charge capacity of a battery reaches a learning capacity of the battery at that time, and the learning capacity is decreased by a specified cycle degradation capacity per charge of the one cycle, and further, a decreasing rate of the learning capacity is specified as a keeping degradation capacity while a keeping temperature and a residual capacity of the battery are used as parameters, and as a keeping time passes, the learning capacity can also be decreased by the keeping degradation capacity specified from the keeping temperature and the residual capacity of the battery.

The cycle degradation capacity can be made 0.003 to 0.15% of the learning capacity. With respect to the keeping degradation capacity with the keeping temperature and the residual capacity of the battery as the parameters, a keeping degradation capacity per unit time is stored as a table, the keeping degradation capacity per unit time is judged from the table, and the learning capacity in a keeping state can be corrected.

The foregoing residual capacity correction method for the battery has a feature that the learning capacity of the battery can be corrected simply, easily and more accurately. This is because in the residual capacity correction method for the battery, the count of one cycle is made each time the accumulated quantity of the charge capacity of the battery reaches the learning capacity of the battery at that time, and the learning capacity is decreased by the specified cycle degradation capacity per charge of the one cycle. Alternatively the decreasing rate of the learning capacity is specified as the keeping degradation capacity while the keeping temperature and the residual capacity of the battery are used as the parameters, and as the keeping time passes, the learning capacity is decreased by the keeping degradation capacity specified from the keeping temperature and the residual capacity of the battery.

In the residual capacity correction method in which the learning capacity is decreased by the specified cycle degradation capacity per charge of the one cycle in which the accumulated quantity of the charge capacity reaches the learning capacity at that time, there is a feature that the learning capacity of the battery can be accurately corrected in the state where full charge and complete discharge of the battery are not repeated, that is, while the battery is conveniently used in the state where it can always be used.

According to the residual capacity correction method in which the decreasing rate of the learning capacity is specified as the keeping degradation capacity while the keeping temperature and the residual capacity of the battery are used as the parameters, and the learning capacity is decreased, the learning capacity of the battery kept in a state in which charge and discharge are not performed in a long period can be accurately corrected, and an error of an indication of the residual capacity when the battery is used after the long keeping can be reduced.

The above and further objects and features of the invention will more fully be apparent from the following detailed description with accompanying drawings.

DETAILED DESCRIPTION OF PREFERRED EMBODIMENTS

Figure 1:
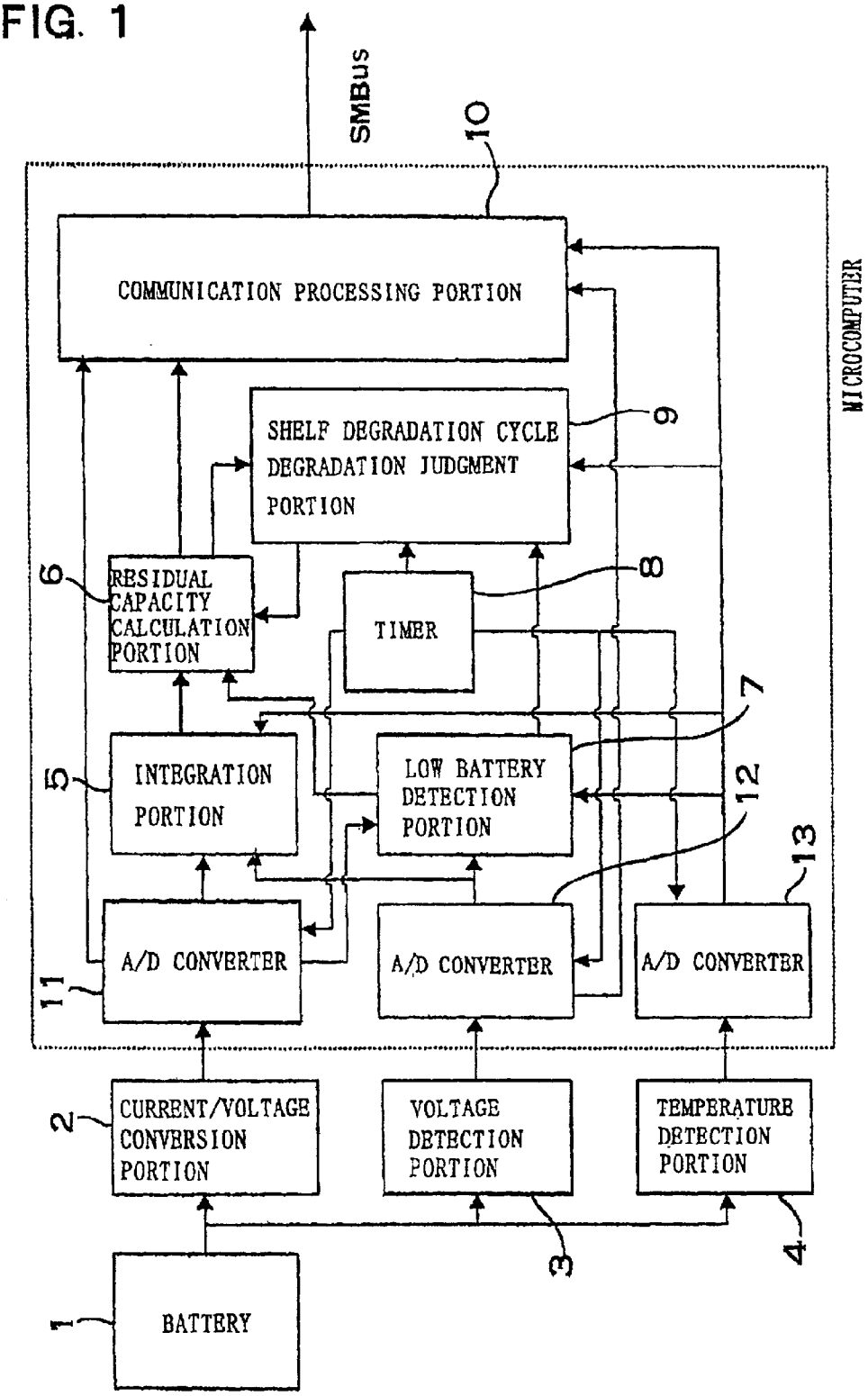
FIG. 1 is a circuit diagram of a combination battery used for a residual capacity correction method of an embodiment of the present invention.

FIG. 1 is a circuit diagram of a combination battery used in a residual capacity correction method of the present invention. This combination battery includes a battery 1, a current/voltage conversion portion 2 for converting a current of charge and discharge into a voltage, a voltage detection portion 3 for detecting a voltage of the battery 1, a temperature detection portion 4 for detecting temperature of the battery 1, an A/D converter 11 for converting an analog signal of an output signal of the current/voltage conversion portion 2 into a digital signal, an A/D converter 12 for converting an analog signal outputted from the voltage detection portion 3 into a digital signal, an A/D converter 13 for converting an output signal of an analog signal of the temperature detection portion 4 into a digital signal, an integration portion 5 for integrating a charge and discharge current or electric power by calculating the output signal of the A/D converter 11, a residual capacity calculation portion 6 for calculating a residual capacity of the battery 1 from the output of this integration portion 5, a low battery detection portion 7 for comparing an output voltage of the A/D converter 12 with a stored set voltage, a timer 8 for determining sampling periods of the A/D converters 11 to 13, a shelf degradation cycle degradation judgment portion 9 of the battery 1, and a communication processing portion 10 for transmitting battery information through an SMBus to an electrical equipment using the battery 1 as the power source.

The battery 1 is a lithium ion secondary battery or a nickel-hydrogen battery. Incidentally, the battery 1 may be any battery which can be charged, such as a nickel-cadmium battery. In the battery 1, one or plural secondary batteries are connected in series or in parallel.

The current/voltage conversion portion 2 for converting the current of charge and discharge of the battery 1 into the voltage includes, although not shown, a current detection resistor connected in series with the battery, and an amplifier for amplifying a voltage generated at both ends of the current detection resistor. Since the voltage in proportion to the current flowing to the battery 1 is generated by the current detection resistor, the current can be detected through the voltage. The amplifier is an operational amplifier which can amplify plus and minus signals, and discriminates between a charge current and a discharge current by the plus and minus of the output voltage. The analog signal of the output signal of the current/voltage conversion portion 2 is converted into the digital signal by the A/D converter 11. This digital signal is outputted to the integration portion 5, the communication processing portion 10, and the low battery detection portion 7.

The voltage detection portion 3 detects the voltage of the battery 1. The detected signal is converted into the voltage signal of the digital signal by the A/D converter 12, and is outputted to the low battery detection portion 7. When the battery voltage is lowered to a discharge end voltage (E. V), the low battery detection portion 7 outputs a discharge end voltage signal to the residual capacity calculation portion 6, and further, when the voltage of the battery 1 is lowered to an over discharge voltage, it outputs an over discharge voltage signal.

The temperature detection portion 4 detects the temperature of the battery 1. The detected signal is converted into the digital signal by the A/D converter 13, and the converted digital signal of the temperature is outputted to the low battery detection portion 7, the integration portion 5 the shelf degradation cycle degradation judgment portion 9, and the communication processing portion 10.

The integration portion 5 calculates the current signal of the digital signal inputted from the A/D converter 11 and calculates the residual quantity of the battery 1. The integration portion 5 subtracts a discharge capacity from a charge capacity of the battery 1, and calculates the residual quantity of the battery 1 as an integrated value (Ah) of current. The charge capacity is an integrated value of the discharge current of the battery 1 or is calculated by multiplying this by charging efficiency. The discharge capacity is an integrated value of the discharge current or is calculated in view of discharge efficiency. The integration portion 5 can also calculate the residual quantity through an integrated value (Wh) of electric power, instead of the integration of the current. The integrated value of the electric power is calculated by subtracting discharge electric power from charge electric power. The electric power is calculated by multiplying the current signal inputted from the A/D converter 11 by the voltage inputted from the A/D converter 12.

The integration portion 5 corrects the residual quantity by use of the voltage signal inputted from the A/D converter 12. When a signal indicating that the voltage of the battery 1 is lowered to the discharge end voltage is inputted from the A/D converter 12, the integration portion 5 corrects the calculated residual quantity to 0. This is because when the battery voltage is lowered to the discharge end voltage, the actual capacity of the battery 1 becomes 0.

The residual capacity calculation portion 6 calculates the learning capacity, and calculates a residual ratio (%) of the battery 1 from the calculated learning capacity and the residual quantity inputted from the integration portion 5. The residual ratio of the battery 1 is calculated through the ratio of residual quantity/learning capacity. The residual quantity is inputted from the integration portion 5. Further, the residual capacity calculation portion 6 calculates, as the learning capacity, an integrated capacity (Ah or Wh) from the state where the battery 1 is completely discharged to the full charge or an integrated capacity (Ah or Wh) from the state of the full charge to the complete discharge. The state where the battery 1 is completely discharged and the state where the battery is fully charged are detected from battery voltage. When the battery 1 is completely discharged, the low battery detection portion 7 outputs the signal indicating that voltage becomes the discharge end voltage to the residual capacity calculation portion 6. When the battery 1 is fully charged, since the voltage of the battery 1 is raised to the full charge voltage, this signal is outputted from the A/D converter 12 to the residual capacity calculation portion 6.

Although the integrated capacity from the full charge to the complete discharge or the integrated capacity from the complete discharge to the full charge accurately indicates the learning capacity of the battery 1, in order to calculate the learning capacity from this integrated value, it is necessary to fully charge the battery 1 and to completely discharge it.

In the state where only one of the full charge and the complete discharge occurs, the learning capacity can not be accurately calculated. However, even if the battery 1 is used in the state where the full charge and the complete discharge are not repeated, or even if the battery is in the state where it is not used and is left as it is, it is degraded and the learning capacity is decreased.

The shelf degradation cycle degradation judgment portion 9 calculates the state of the change of the learning capacity when the battery 1 is used in the state where the full charge and the complete discharge are not repeated, or when it is not used and is kept. The shelf degradation cycle degradation judgment portion 9 accurately corrects the learning capacity from the number of times the accumulated quantity of the charge capacity reaches the learning capacity at that time and external conditions under which the battery is left as it is.

In the method of correcting the learning capacity by use of the number of times the accumulated quantity of the charge capacity reaches the learning capacity, the charge capacity is accumulated, and each time the accumulated quantity reaches the learning capacity of the battery at that point of time, a count of one cycle is made, and the learning capacity is decreased by a specified cycle degradation capacity per charge of the one cycle. For example, in the case where the present learning capacity is 1000 mAh, when a first charge of 500 mAh, a second charge of 200 mAh, and a third charge of 300 mAh are performed, since the accumulated quantity of the charge capacity reaches 1000 mAh, it is judged that the charge of one cycle is performed. During this time, the battery can perform the discharge, and also perform the full charge. That is, in this correction method, irrespective of the existence of the discharge and the full charge, the charge capacity of the battery is accumulated, and each time this accumulated quantity reaches the learning capacity of the battery at that time, the count of one cycle is made, and the learning capacity is decreased by the specified cycle degradation capacity per charge of the one cycle. When the charge of one cycle is counted, the accumulated quantity of the charge capacity is reset to 0.

The cycle degradation capacity is made, for example, 0.08% of the former learning capacity in a lithium ion secondary battery. In the case where the cycle degradation capacity is made this constant, the learning capacity is calculated by the following expression each time the battery 1 is fully charged once;

learning capacity (new)=learning capacity (old)×0.9992.

In the above, although the cycle degradation capacity is made 0.08% of the former learning capacity, the cycle degradation capacity can also be made, for example, 0.003 to 0.15% according to the kind of the battery and the use environment.

Further, even when the battery 1 is not used but is kept in a non-use state, it is slightly degraded and its learning capacity is decreased. The degradation of the battery 1 in the keeping or non-use state is changed according to the keeping temperature and the residual capacity. In order to correct the learning capacity in the keeping state, the shelf degradation cycle degradation judgment portion 9 specifies the decreasing rate of the learning capacity as a keeping degradation capacity by using the keeping temperature and the residual capacity of the battery, which is not used but is kept, as parameters. A correction is made so that as the keeping time passes, the learning capacity is decreased by the keeping degradation capacity specified from the keeping temperature and the residual capacity of the battery 1. The keeping degradation capacity per unit time with the keeping temperature and the residual capacity of the battery 1 as the parameters is stored in a memory of the shelf degradation cycle degradation judgment portion 9.

Figure 2:
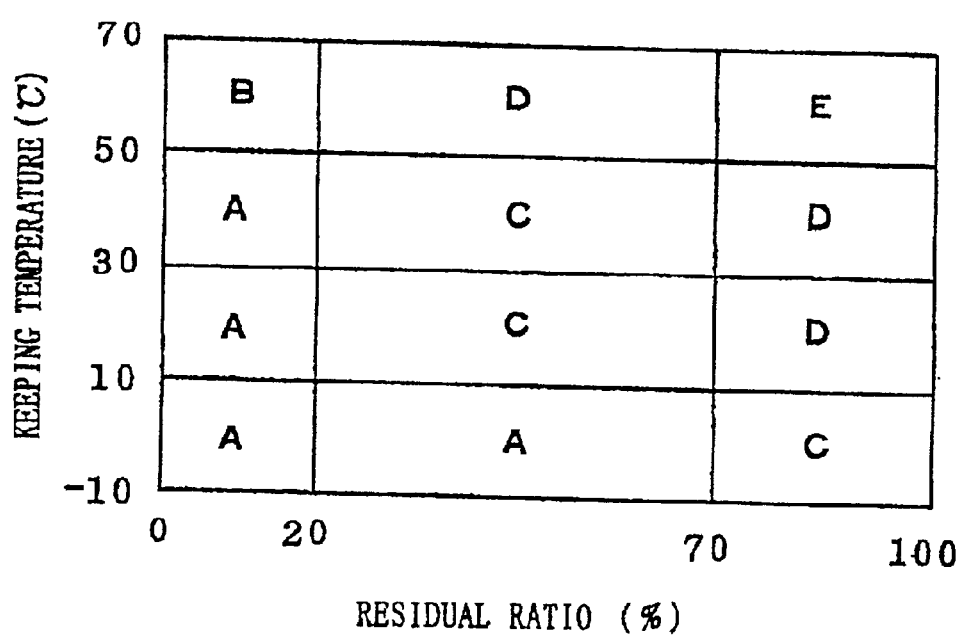
FIG. 2 is a view showing an example of a table of a keeping degradation capacity per unit time with a battery temperature and a residual capacity as parameters.

FIG. 2 shows a table stored in the memory. The table of this drawing specifies the keeping degradation capacity per unit time as a coefficient with the keeping temperature and the residual ratio (%) of the battery 1 as parameters. In other words, the coefficient for calculation of the keeping degradation capacity is specified from the keeping temperature and the residual ratio. In the table of this drawing, as the residual capacity, the residual ratio (%) is made the parameter, however, the residual quantity (Ah or Wh) can also be made the parameter. The shelf degradation cycle degradation judgment portion 9 specifies the keeping degradation capacity per unit time from the keeping temperature and the residual capacity of the battery 1 and from the coefficient of the keeping degradation capacity table, adds the specified coefficient as a time passes, and corrects the learning capacity in the keeping state.

FIG. 2 shows the coefficient for calculation of the keeping degradation capacity of the battery 1 for one minute in the keeping state. This coefficient is made such a numerical value that when an added count value becomes $10^6$, the learning capacity is decreased by 1%. In this drawing, A to E are determined to be the following coefficients. However, A to E can also be determined to be within the range shown in the bracket according to the battery.

| | |
|---|---|
| A . . . 2.5 | (0 to 5) |
| B . . . 8 | (6 to 10) |
| C . . . 15 | (11 to 20) |
| D . . . 35 | (21 to 50) |
| E . . . 75 | (51 to 100) |

The shelf degradation cycle degradation judgment portion 9 adds the coefficient of the table specified from the keeping temperature and the residual capacity every minute, and when the added count value reaches $10^6$, it decreases the learning capacity by 1%. This shelf degradation cycle degradation judgment portion 9 adds, with one minute as a unit, the coefficient for calculation of the keeping degradation capacity from the keeping temperature and the residual capacity, so that the learning capacity can be very accurately corrected in the state where the temperature at which the battery 1 is left as it is and the residual capacity are changed. However, the unit time when the shelf degradation cycle degradation judgment portion 9 adds the coefficient from the keeping temperature and the residual capacity can also be made, for example, 30 seconds to 60 minutes, preferably one minute to 30 minutes. Since the table of FIG. 2 shows the coefficient for correction of the learning capacity with one minute as a unit, the coefficient for correction of the learning capacity with 60 minutes as a unit becomes 60 times as large as that of this table.

Further, in the table of FIG. 2, although the keeping temperature is divided into four regions, and the residual capacity is divided into three regions, it is also possible to further finely divide the keeping temperature and the residual capacity to more accurately correct the learning capacity. Further, although the table of FIG. 2 shows the coefficient for correction of decreasing the learning capacity by 1% when the count value becomes $10^6$, a numerical value for direct correction of the learning capacity through the count value of addition of the coefficient can also be stored as a table. Further, the coefficient stored in the table can be made a numerical value expressing, by %, a rate at which the learning capacity is decreased through the count value, or can also be made a numerical value for decrease of the learning capacity by Ah or Wh.

Besides, in the shelf degradation cycle degradation judgment portion 9, not the table, but a function for specifying the coefficient for calculation of the learning capacity from the keeping temperature and the residual capacity can also be stored in the memory. This shelf degradation cycle degradation judgment portion 9 calculates the coefficient in the keeping state from the keeping temperature and the residual capacity of the battery 1, adds the calculated coefficient, and corrects the learning capacity from the added count value.

The shelf degradation cycle degradation judgment portion 9 outputs the corrected learning capacity to the residual capacity calculation portion 6, and the residual capacity calculation portion 6 calculates the residual capacity of the battery 1 from the ratio of the learning capacity inputted from the shelf degradation cycle degradation judgment portion 9 to the dischargeable capacity inputted from the integration portion 5.

The communication processing portion 10 transmits the residual capacity calculated by the residual capacity calculation portion 6, the battery voltage detected by the voltage detection portion 3, and the temperature detected by the temperature detection portion 4 to equipment installed through the SMBus.

The foregoing combination battery performs the following operation in the state where it is installed in the electrical equipment such as a microcomputer, and transmits the residual capacity to the electrical equipment.

(1) When the electrical equipment is used, the combination battery is charged and discharged. When the combination battery is charged, the shelf degradation cycle degradation judgment portion 9 counts one cycle each time the accumulated quantity of the charge capacity reaches the learning capacity at that time. Each time a count of one cycle is made, the learning capacity is decreased by the keeping degradation capacity. The calculated learning capacity is outputted to the residual capacity calculation portion 6. The residual capacity calculation portion 6 calculates the ratio of the residual quantity to the learning capacity, and calculates the residual ratio of the combination battery. The residual quantity is inputted from the integration portion 5. The calculated residual ratio is outputted through the SMBus to the electrical equipment.

(2) When the combination battery is in the keeping or non-use state in which charge and discharge are not performed, the shelf degradation cycle degradation judgment portion 9 detects the keeping temperature and the residual capacity of the battery 1. The keeping temperature is inputted from the A/D converter 13, and the residual capacity is inputted from the residual capacity calculation portion 6. When the keeping temperature and the residual capacity are specified, the coefficient is specified from the table stored in the memory. This is repeated every minute, and the specified coefficient is added every minute. When the added count value becomes $10^6$, the shelf degradation cycle degradation judgment portion 9 corrects the learning capacity to decrease it by 1%, and outputs the corrected learning capacity to the residual capacity calculation portion 6. The residual capacity calculation portion 6 calculates the residual ratio on the basis of the corrected learning capacity.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A residual capacity correction method for a battery wherein the battery is used in a state in which the full charge and complete discharge are not repeated, the method comprising:

making a count of one cycle each time an accumulated quantity of a charge capacity of a battery reaches a learning capacity; and decreasing the learning capacity by a specified cycle degradation capacity per charge of the one cycle.

2. A residual capacity correction method for a battery according to claim 1, wherein the set capacity is the learning capacity of the battery.

3. A residual capacity correction method for a battery according to claim 2, wherein the cycle degradation capacity is made 0.003 to 0.15% of the learning capacity of the battery.

4. A residual capacity correction method for a battery according to claim 1, wherein the battery is a lithium ion secondary battery.

5. A residual capacity correction method for a battery according to claim 1, further comprising the steps of:

specifying a decreasing rate of the learning capacity as a keeping degradation capacity while a keeping temperature and a residual capacity of the battery are used as parameters; and decreasing, as a keeping time passes, the learning capacity by the keeping degradation capacity specified from the keeping temperature and the residual capacity of the battery.

6. A residual capacity correction method for a battery according to claim 5, wherein the keeping degradation capacity per unit time is stored as a table while the keeping temperature and the residual capacity of the battery are made the parameters, the keeping degradation capacity per unit time is judged from the table, and the learning capacity in a keeping state is corrected.

7. A residual capacity correction method for a battery, wherein the battery is not used but is kept in a non-use state, the method comprising:

specifying a decreasing rate of a learning capacity as a keeping degradation capacity while a keeping temperature and a residual capacity of the battery are used as parameters; and decreasing, as a keeping time passes, the learning capacity by the keeping degradation capacity specified from the keeping temperature and the residual capacity of the battery.

8. A residual capacity correction method for a battery according to claim 7, wherein the keeping degradation capacity per unit time is stored as a table while the keeping temperature and the residual capacity of the battery are used as the parameters, the keeping degradation capacity per unit time is judged from the table, and the learning capacity in a keeping state is corrected.

9. A residual capacity correction method for a battery according to claim 7, wherein a count of one cycle is made each time an accumulated quantity of a charge capacity of the battery reaches a set capacity, and the learning capacity is decreased by a specified cycle degradation capacity per charge of the one cycle.

10. A residual capacity correction method for a battery according to claim 9, wherein the set capacity is the learning capacity of the battery.

11. A residual capacity correction method for a battery according to claim 10, wherein the cycle degradation capacity is made 0.003 to 0.15%.

12. A residual capacity correction method for a battery according to claim 7, wherein the battery is a lithium ion secondary battery.

* * * * *